| (12) | United States Patent<br>Yang et al. | (10) Patent No.: US 9,328,823 B2<br>(45) Date of Patent: May 3, 2016 |
|---|---|---|

(54) STEEL PISTON HAVING COOLING CHANNEL WITHOUT FLASH

(71) Applicant: Dong Yang Piston Co., Ltd., Gyeonggi-do (KR)

(72) Inventors: Jun-Kui Yang, Seoul (KR); Kwan-Ho Ryu, Gyeonggi-do (KR); Jeong-Keun Lee, Gyeonggi-do (KR); Sang-Bean Park, Gyeonggi-do (KR); In-Cheol Yoo, Gyeonggi-do (KR)

(73) Assignee: Dong Yang Piston Co., Ltd., Gyeonggi-do (KR)

( * ) Notice: Subject to any disclaimer, the term of this patent is extended or adjusted under 35 U.S.C. 154(b) by 108 days.

(21) Appl. No.: 14/144,944

(22) Filed: Dec. 31, 2013

(65) Prior Publication Data

US 2015/0007717 A1 Jan. 8, 2015

(30) Foreign Application Priority Data

Jul. 2, 2013 (KR) ........................ 10-2013-0077212

(51) Int. Cl.
*F16J 1/09* (2006.01)

(52) U.S. Cl.
CPC ........................ *F16J 1/09* (2013.01)

(58) Field of Classification Search
CPC .............................. F02F 2003/0061; F16J 1/09
USPC .................................................. 92/231, 260
See application file for complete search history.

(56) References Cited

U.S. PATENT DOCUMENTS

| 2,273,986 A | * | 2/1942 | Pickett ........................... 92/176 |
| 2009/0220820 A1 | * | 9/2009 | Kolbe et al. ................... 428/654 |
| 2010/0275873 A1 | * | 11/2010 | Gniesmer et al. .......... 123/193.6 |
| 2012/0080004 A1 | * | 4/2012 | Menezes et al. ........... 123/193.6 |
| 2012/0222305 A1 | * | 9/2012 | Scharp et al. ............ 29/888.042 |

* cited by examiner

*Primary Examiner* — Nathaniel Wiehe
*Assistant Examiner* — Abiy Teka
(74) *Attorney, Agent, or Firm* — Rabin & Berdo, P.C.

(57) ABSTRACT

The present invention provides a steel piston having cooling channel without flash, including an upper piston part having a circle shape outer wall and an inner wall formed inward from the outer wall with a desired distance, and a lower piston part having a circle shape outer wall and an inner wall formed inward from the outer wall with a desired distance on the place corresponding each other when they are coupled, in which one or more concave grooves are formed on the outer wall of the upper piston part, and two concave grooves are formed on the inner wall of the upper piston part, and the inner circumference surface of the upper end of the outer wall of the lower piston part is carved as much as a desired depth, and therefore, a stepped portion is formed between the inner and the outer circumference surfaces, and the inner and outer circumference surfaces of the upper end of the inner wall of the lower piston part are carved as much as a desired depth, and a protrusion is formed at the middle of the upper end of the inner wall, and therefore, the stepped portions are formed between the inner and outer circumference surfaces, and therefore, having the effect that improve the cooling efficiency of the piston by preventing from accumulating of carbides by limiting forming flash inside oil gallery during friction welding.

12 Claims, 3 Drawing Sheets

STEEL PISTON HAVING COOLING CHANNEL WITHOUT FLASH

CROSS-REFERENCE TO RELATED APPLICATION

This application claims priority from Korean Patent Application No. 10-2013-0077212, filed on Jul. 2, 2013 in the Korean Intellectual Property Office, the disclosure of which is incorporated herein by reference.

BACKGROUND

1. Field

The present invention relates to a steel piston having cooling channel without flash, and more particularly to the steel piston having cooling channel without flash which improves a cooling efficiency of the piston by deleting flash formed inside of an oil gallery during friction welding, preventing from forming of carbide, and improving a fluidity of oil inside of the oil gallery.

2. Description of the Related Art

A recently developed engine is aimed to have improved fuel economy, and to have high output and light weight to overcome environmental regulations, and it is seriously necessary to develop a steel piston to invent a high output and downsized engine as a next generation engine.

Also, a piston which is a key component of the next generation engine should endure high combustion and temperature, particularly, it is absolutely necessary to improve a cooling efficiency of the piston because a fatigue property and density of the material in a high temperature are decreasing.

However, as shown in FIG. 1, flash (3) is formed on an inner and an outer circumference surface of the oil gallery (2) of the conventional piston (1) during friction welding, and the flash formed on the inner circumference surface and the outer circumference surface of the oil gallery (2) incurs problem.

In other words, as said flash is formed on the inner and the outer circumference surfaces of the oil gallery (2) by friction welding, carbides get accumulated on the flash (3), and the oil fluidity is decreased by the oil, and therefore, the cooling efficiency of the piston, which is opposed to the technology aiming to improve the fatigue property and density of the piston as the main component of the next generation engine in the high temperature by improving the cooling efficiency.

Also, it has a problem of incurring cracking in the middle area of said flash (3) by a notch effect which is increasing of stress and becoming as the crack causing area (4).

SUMMARY

The present invention is conceived to solve the foregoing problems. That is, it is about a steel piston having cooling channel without flash improving a cooling efficiency of the piston to improve a cooling efficiency by improving an oil fluidity inside of an oil gallery by preventing of incurring cracking and of accumulation of the carbides by restrict on forming flash on the inner and outer circumference surfaces of oil gallery during friction welding.

In order to accomplish the above object, the present invention provides a steel piston having cooling channel without flash, including an upper piston part having a circle shape outer wall and an inner wall formed inward from the outer wall with a desired distance, and a lower piston part having a circle shape outer wall and an inner wall formed inward from the outer wall with a desired distance on the place corresponding each other when they are coupled, in which one or more concave grooves are formed on the outer wall of the upper piston part, and two concave grooves are formed on the inner wall of the upper piston part, and the inner circumference surface of the upper end of the outer wall of the lower piston part is carved as much as a desired depth, and therefore, a stepped portion is formed between the inner and the outer circumference surfaces, and the inner and outer circumference surfaces of the upper end of the inner wall are carved as much as a desired depth, and a protrusion is formed at the middle of the upper end of the inner wall, and therefore, the stepped portions are formed on both side of the protrusion.

A steel piston having cooling channel without flash according to the present invention has an effect that improves the cooling efficiency of the piston by preventing from accumulating of carbides by limiting flash forming inside oil gallery during friction welding.

Also, the steel piston having cooling channel without flash according to the present invention has an effect that prevents from cracking by notch effect as flash is being acted as the crack-causing area by limiting forming flash inside of the oil gallery.

DETAILED DESCRIPTION OF EXEMPLARY EMBODIMENTS

Figure 1:
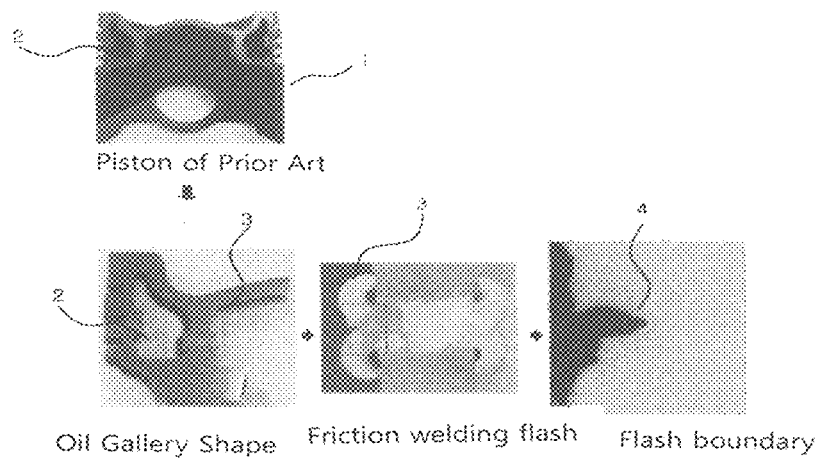
FIG. 1 is a view showing a conventional steel piston having cooling channel with flash.

Hereinafter, exemplary embodiments according to the present invention will be described in detail with reference to accompanying drawings. Prior to this, terms or words used in this specification and claims have to be interpreted as the meaning and concept adaptive to the technical idea of the present invention rather than typical or dictionary interpretation on a principle that an inventor is allowed to properly define the concept of the terms in order to explain his/her own invention in the best way.

Therefore, because embodiments disclosed in this specification and configurations illustrated in the drawings are nothing but preferred examples of the present invention and do not fully describe the technical idea of the present invention, it will be appreciated that there are various equivalents and alterations replacing them at a filing date of the present application.

Figure 2:
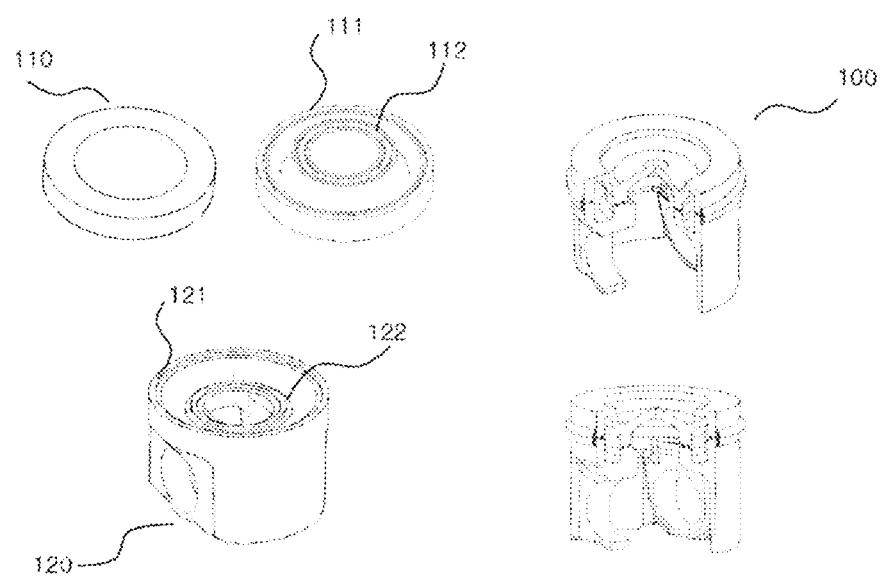
FIGS. 2 and 3 are a perspective view showing an upper piston part and a lower piston part of a steel piston having cooling channel without flash and a partially exploded perspective view of the steel piston having cooling channel without flash according to the present invention.
Figure 3:
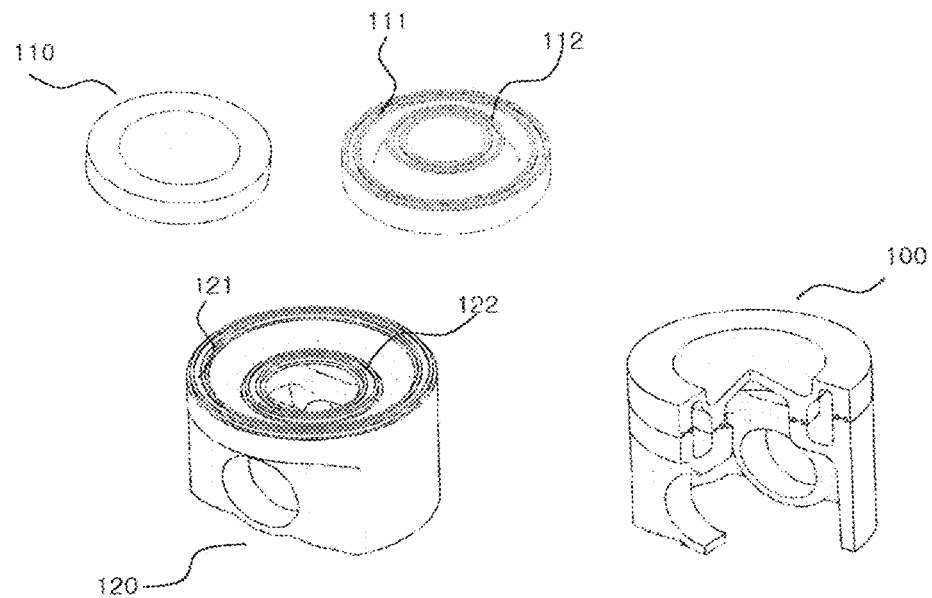

FIGS. 2 and 3 are perspective views showing an upper piston part and a lower piston part of a steel piston having cooling channel without flash and a partially exploded perspective view of the steel piston having cooling channel without flash according to the present invention.

As shown in FIGS. 2 and 3, the steel piston having cooling channel without flash comprises an upper piston part (110) and a lower piston part (120).

The upper piston part (110) is coupled over the lower piston part (120) by friction welding.

Figure 4:
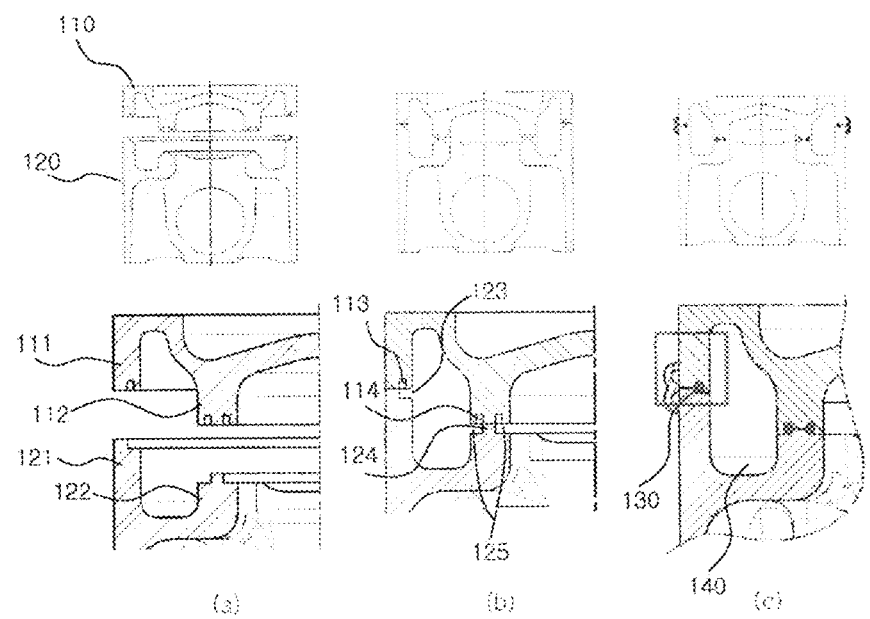
FIGS. 4 and 5 are views showing the process of producing the steel piston having cooling channel without flash according to the present invention.
Figure 5:
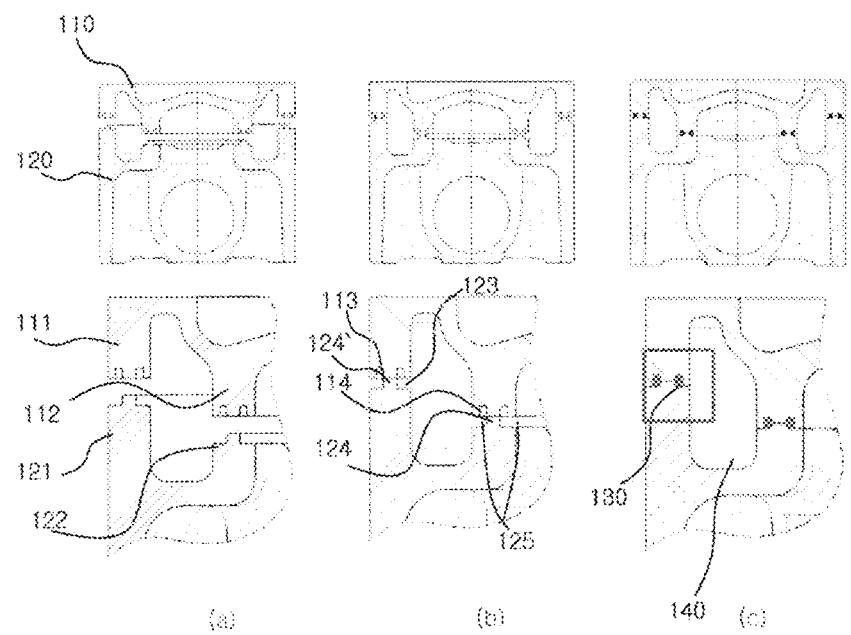

Referring FIGS. 4 and 5, the steel piston having cooling channel without flash according to the present invention is explained more particularly.

As reference, the FIGS. 4 and 5 are views showing the process of producing the steel piston having cooling channel without flash according to the present invention.

Differently from the conventional piston as shown FIG. 1, the piston according to the present invention as shown in FIGS. 2, 3 4a and 5a, comprises an upper piston part (110) having a circle shape outer wall (111) and an inner wall (112) formed inward from the outer wall (111) with a desired distance.

Also, a circle shape outer wall (121) and an inner wall (122) formed inward from the outer wall (121) of the lower piston part (120) as like the upper piston part (110) with a desired distance on the place corresponding each other when the lower piston part (120) is coupled with the upper piston part (110).

Also, one circle shape concave groove (113) is formed on the outer wall (111) of the upper piston part (110) along the surface meeting the outer wall (121) of the lower piston part (120) as shown in FIG. 4b, or one or more circle shape concave grooves (113) are formed on the outer wall (111) of the upper piston part (110) along the surface meeting the outer wall (121) of the lower piston part (120) as shown in FIG. 5b.

Also, two circle shape concave grooves (114) are formed on the inner wall (122) of the upper piston part (110) along the surface meeting the inner wall (120) of the lower piston part (120).

In the meantime, as shown in FIG. 4b, the inner circumference surface of the upper end of the outer wall (121) of the lower piston part (120) is carved as much as a desired depth, and therefore, a stepped portion (123) is formed between the inner and the outer circumference surfaces.

Also, as shown in FIG. 5b, the inner and outer circumference surfaces of the upper end of the outer wall (121) are carved as much as the desired depth, and a protrusion (124) is formed at the middle of the upper end of the outer wall (121), and therefore, the stepped portions (123) can be formed on both side of the protrusion (124).

The inner and outer circumference surfaces of the upper end of the inner wall (122) of the lower piston part (120) are carved as much as the desired depth, and a protrusion (124) is formed at the middle of the upper end of the inner wall (122), and therefore, stepped portions (125) are formed on both side of the protrusion (124).

As the upper piston part (110) is coupled over the lower piston part (120) according to the constructions as described above, as shown FIGS. 4b and 5b, the concave groove (113) formed on the outer wall (111) of the upper piston part (110) meets the stepped portion (123) formed on the outer wall (121) of the lower piston part (120), and the concave groove (114) formed on the inner wall (112) of the upper piston part (110) meets the protrusion (124) and the stepped portions (125) formed on the outer wall (122) of the lower piston part (120).

As the friction welding is performed to couple the upper piston part (110) and the lower piston part (120), as shown in FIG. 4c, the flash (130) is formed between the groove (113) formed on the outer wall (111) of the upper piston part (110) and the stepped portion (123) formed on the outer wall (121) of the lower piston part (120).

In the meantime, as shown in FIG. 5c, in case that two concave grooves (113) are formed on the outer wall (111), the flash is not formed out of the piston, but the flash is formed between the two grooves (113) formed on the outer wall (111) of the upper piston (110) and the stepped portions (123) formed on both side of protrusion (124) formed on the outer wall (121) of the lower piston (120).

Also, the flash (130) is formed between the concave groove (114) formed on the inner wall (112) of the upper piston part (110) and the stepped portions (125) formed on both side of the protrusion (124) formed at the middle of the inner wall (122) of the lower piston part (120) as friction welding is performed.

As described above, as the flash (130) is formed between the groove (113) formed on the outer wall (111) of the upper piston part (110) and the stepped portion (123) formed on the outer wall (121) of the lower piston part (120), and between the groove (114) formed on the inner wall (112) of the upper piston part (110) and the stepped portion (125) formed on both side of the protrusion (124) formed in the middle of the outer wall (122) of the lower piston part (120), flash (130) is not formed inside of the cooling channel or the oil gallery (140).

Although some embodiments have been described herein with reference to the accompanying drawings, it will be understood by those skilled in the art that these embodiments are provided for illustration only, and various modifications, changes, alterations and equivalent embodiments can be made without departing from the scope of the present invention. Therefore, the scope and sprit of the present invention should be defined only by the accompanying claims and equivalents thereof.

What is claimed is:

1. A steel piston comprising:
 a cooling channel free of any flash;
 an upper piston part having a circle-shaped upper outer wall and an upper inner wall formed inward from the upper outer wall with a predetermined distance therebetween, the upper outer wall having one or more concave grooves, and the upper inner wall having two concave grooves; and
 a lower piston part having a circle-shaped lower outer wall and a lower inner wall formed inward from the lower outer wall at a predetermined distance from each other when the lower outer wall and the lower inner wall are coupled with the upper piston part, wherein
 an inner circumference surface of an upper end of lower outer wall is carved to a predetermined depth to form a first stepped portion between the inner circumference and an outer circumference surface of the upper end of the lower outer wall, and inner and outer circumference surfaces of an upper end of the lower inner wall are carved to a predetermined depth, and the lower inner wall having a protrusion formed at a middle location of the upper end of the lower inner wall so that the lower inner wall forms second stepped portions on both of two opposite sides of the protrusion, the protrusion being positioned within the upper inner wall.

2. The steel piston according to claim 1, further comprising a flash formed between the one or more concave grooves of the upper outer wall and the first stepped portions during friction welding to couple the upper piston part and the lower piston part together.

3. The steel piston according to claim 1, further comprising a flash formed between the two concave grooves and the second stepped portions during friction welding to couple the upper piston part and the lower piston part together.

4. The steel piston according to claim 1, wherein the two concave grooves are disposed within the upper inner wall so as to not be within the cooling channel.

5. The steel piston according to claim 1, wherein the two concave grooves are disposed within the upper inner wall so as to be separated from the cooling channel to be non-contiguous with all of the cooling channel.

6. The steel piston according to claim 1, wherein the two concave grooves are separated from all of the cooling channel by the upper inner wall of the upper piston part.

7. The steel piston according to claim 1, wherein the second stepped portions are disposed in an interior of the lower inner wall so as to not form any wall of the cooling channel.

8. The steel piston according to claim 1, wherein the second stepped portions are disposed within the upper inner wall so as to be separated from the cooling channel to be non-contiguous with all of the cooling channel.

9. The steel piston according to claim 1, further comprising a flash disposed within the two concave grooves and in direct contact with the second stepped portions.

10. The steel piston according to claim 1, further comprising a flash in direct contact with the protrusion.

11. A steel piston comprising:
a cooling channel being free of any flash;
an upper piston part having a circle-shaped upper outer wall and an upper inner wall formed inward from the upper outer wall with a predetermined distance therebetween, the upper outer wall having one or more concave grooves, and the upper inner wall having two concave grooves;
a lower piston part having a circle-shaped lower outer wall and a lower inner wall formed inward from the lower outer wall at a predetermined distance at a position corresponding to each other when the lower outer wall and the lower inner wall are coupled with the upper piston part,
an inner circumference surface of an upper end of the lower outer wall is carved to a predetermined depth to form a first stepped portion between the inner circumference and an outer circumference surface of the upper end of the lower outer wall, and inner and outer circumference surfaces of an upper end of the lower inner wall are carved to a predetermined depth, and the lower inner wall having a protrusion formed at a middle location of the upper end of the lower inner wall so that the lower inner wall forms second stepped portions on both of two opposite sides of the protrusion; and
a flash disposed within the two concave grooves and in direct contact with the second stepped portions.

12. A steel piston comprising:
a cooling channel free of any flash;
an upper piston part having a circle-shaped upper outer wall and an upper inner wall formed inward from the upper outer wall with a predetermined distance therebetween, the upper outer wall having one or more concave grooves, and the upper inner wall having two concave grooves; and
a lower piston part coupled having a circle-shaped lower outer wall and a lower inner wall formed inward from the lower outer wall at a predetermined distance from each other, the upper and lower piston parts being coupled together, wherein
an inner circumference surface of an upper end of the lower outer wall is carved to a predetermined depth to form a first stepped portion between the inner circumference and an outer circumference surface of the upper end of the lower outer wall, and inner and outer circumference surfaces of an upper end of the lower inner wall are carved to a predetermined depth, and the lower inner wall having a protrusion formed at a middle of a location of the upper end of the lower inner wall so that the lower inner wall forms second stepped portions on both of two opposite sides of the protrusion, the protrusion being positioned within the upper inner wall.

* * * * *